US011009467B2

(12) United States Patent
Park et al.

(10) Patent No.: US 11,009,467 B2
(45) Date of Patent: May 18, 2021

(54) MODEL-BASED METHODS AND APPARATUS FOR CLASSIFYING AN INTERFERENT IN SPECIMENS

(71) Applicant: Siemens Healthcare Diagnostics Inc., Tarrytown, NY (US)

(72) Inventors: JinHyeong Park, Princeton, NJ (US); Yao-Jen Chang, Princeton, NJ (US); Wen Wu, Kirkland, WA (US); Terrence Chen, Princeton, NJ (US); Benjamin Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 58 days.

(21) Appl. No.: 15/551,562

(22) PCT Filed: Feb. 16, 2016

(86) PCT No.: PCT/US2016/018062
§ 371 (c)(1),
(2) Date: Aug. 16, 2017

(87) PCT Pub. No.: WO2016/133900
PCT Pub. Date: Aug. 25, 2016

(65) Prior Publication Data
US 2018/0045654 A1    Feb. 15, 2018

Related U.S. Application Data

(60) Provisional application No. 62/117,263, filed on Feb. 17, 2015.

(51) Int. Cl.
*G01N 21/94*      (2006.01)
*G06T 7/00*       (2017.01)
(Continued)

(52) U.S. Cl.
CPC .............. *G01N 21/94* (2013.01); *G01J 3/462* (2013.01); *G01J 3/50* (2013.01); *G01N 21/03* (2013.01);
(Continued)

(58) Field of Classification Search
CPC .................................................. G06T 7/0012
See application file for complete search history.

(56) References Cited

U.S. PATENT DOCUMENTS

| 4,998,824 A |   | 3/1991 | Littlejohn et al. |
| 5,911,000 A | * | 6/1999 | Shen ............ G01N 15/042 382/134 |

(Continued)

FOREIGN PATENT DOCUMENTS

| EP | 0 194 148 A3 | 10/1986 |
| EP | 2 299 258 A1 | 3/2011 |

(Continued)

OTHER PUBLICATIONS

PCT International Search Report and Written Opinion dated Jun. 2, 2016 (8 Pages).

(Continued)

*Primary Examiner* — Gandhi Thirugnanam

(57) ABSTRACT

A model-based method of inspecting a specimen for presence of one or more interferent, such as Hemolysis, Icterus, and/or Lipemia (HI L) is provided. The method includes generating a pixelated image of the specimen in a first color space, determining color components (e.g., an a-value and a b-value) for pixels in the pixelated image, classifying of the pixels as being either liquid or non-liquid, defining one or more liquid regions based upon the pixels classified as liquid, and determining a presence of one or more interferent within the one or more liquid regions. The liquid classification is based upon a liquid classification model. Pixel (Continued)

classification may be based on a trained multiclass classifier. Interference level for the one or more interferent may be provided. Testing apparatus adapted to carry out the method are described, as are other aspects.

27 Claims, 5 Drawing Sheets

(51) Int. Cl.
| | |
|---|---|
| G01J 3/46 | (2006.01) |
| G01J 3/50 | (2006.01) |
| G01N 21/25 | (2006.01) |
| G01N 21/03 | (2006.01) |
| G01N 21/27 | (2006.01) |
| G01N 35/00 | (2006.01) |
| G06K 9/00 | (2006.01) |
| G06K 9/62 | (2006.01) |
| G01N 21/59 | (2006.01) |

(52) U.S. Cl.
CPC .......... *G01N 21/25* (2013.01); *G01N 21/27* (2013.01); *G01N 35/00613* (2013.01); *G06K 9/0014* (2013.01); *G06K 9/00147* (2013.01); *G06K 9/6269* (2013.01); *G06T 7/0012* (2013.01); *G01N 2021/5923* (2013.01); *G01N 2021/5969* (2013.01); *G01N 2201/12* (2013.01); *G06T 2207/10024* (2013.01); *G06T 2207/30024* (2013.01)

(56) References Cited

U.S. PATENT DOCUMENTS

| | | | |
|---|---|---|---|
| 5,911,003 A | 6/1999 | Sones | |
| 6,195,158 B1 | 2/2001 | Cadell et al. | |
| 7,427,508 B2 | 9/2008 | Nekrasov et al. | |
| 7,653,227 B2* | 1/2010 | Krishnan | G16H 50/20 |
| | | | 382/128 |
| 10,746,753 B2* | 8/2020 | Kluckner | G01N 35/1016 |
| 2003/0087456 A1* | 5/2003 | Jones | A61B 5/0059 |
| | | | 436/171 |
| 2005/0163354 A1* | 7/2005 | Ziegler | G01N 15/05 |
| | | | 382/128 |
| 2006/0008132 A1 | 1/2006 | Recht | |
| 2006/0015263 A1* | 1/2006 | Stupp | G06F 17/18 |
| | | | 702/19 |
| 2006/0039593 A1* | 2/2006 | Sammak | G06K 9/00127 |
| | | | 382/133 |
| 2006/0039603 A1* | 2/2006 | Koutsky | G06K 9/00147 |
| | | | 382/165 |
| 2006/0275906 A1* | 12/2006 | Devlin, Sr. | G01N 35/00584 |
| | | | 436/43 |
| 2007/0053794 A1* | 3/2007 | Perez | G01N 35/00732 |
| | | | 422/82.05 |
| 2008/0288227 A1* | 11/2008 | Higgins | G16H 50/20 |
| | | | 703/11 |
| 2010/0322471 A1* | 12/2010 | Treado | G01J 3/2823 |
| | | | 382/103 |
| 2011/0182881 A1* | 7/2011 | Chin | C12Q 1/6809 |
| | | | 424/130.1 |
| 2012/0140230 A1* | 6/2012 | Miller | G01N 15/042 |
| | | | 356/441 |
| 2013/0011042 A1* | 1/2013 | Satish | G06K 9/00 |
| | | | 382/134 |
| 2013/0129166 A1* | 5/2013 | Muller | G01N 35/10 |
| | | | 382/128 |
| 2014/0254900 A1* | 9/2014 | Sturm | A61B 5/0037 |
| | | | 382/128 |
| 2015/0241457 A1* | 8/2015 | Miller | G01N 35/00732 |
| | | | 348/143 |
| 2016/0166160 A1* | 6/2016 | Casale | A61B 5/7253 |
| | | | 600/480 |
| 2018/0033256 A1* | 2/2018 | Hamidat | G06K 7/1447 |
| 2018/0045654 A1* | 2/2018 | Park | G01N 21/94 |
| 2018/0364268 A1* | 12/2018 | Kluckner | G01B 11/245 |
| 2018/0365530 A1* | 12/2018 | Kluckner | G01N 35/04 |
| 2018/0372648 A1* | 12/2018 | Wissmann | G01N 15/042 |
| 2018/0372715 A1* | 12/2018 | Kluckner | G01N 21/314 |
| 2019/0033209 A1* | 1/2019 | Kluckner | G01N 35/04 |
| 2019/0033230 A1* | 1/2019 | Kluckner | G01N 21/9036 |
| 2019/0041318 A1* | 2/2019 | Wissmann | G01N 21/253 |
| 2019/0271714 A1* | 9/2019 | Kluckner | G01N 21/25 |
| 2019/0277870 A1* | 9/2019 | Kluckner | G01J 3/108 |
| 2020/0097701 A1* | 3/2020 | Chukka | G06K 9/6274 |
| 2020/0151498 A1* | 5/2020 | Sun | G06K 9/4628 |
| 2020/0265263 A1* | 8/2020 | Kluckner | G01N 35/00613 |

FOREIGN PATENT DOCUMENTS

| | | |
|---|---|---|
| JP | H09-133687 A | 5/1997 |
| JP | H10-239135 A | 9/1998 |
| JP | 2005-098832 A | 4/2005 |
| JP | 2009-112636 A | 5/2009 |
| JP | 2010-276593 A | 12/2010 |
| JP | 2011-191081 A | 9/2011 |
| JP | 2012-073179 A | 4/2012 |
| JP | 2015-014506 A | 1/2015 |
| WO | 2013/178928 A1 | 12/2013 |
| WO | 2014/031576 A1 | 2/2014 |

OTHER PUBLICATIONS

Extended EP Search Report dated Mar. 2, 2018 of corresponding European Application No. 16752902.3, 4 Pages.
Hunter, Richard Sewall (Dec. 1958). "Photoelectric Color-Difference Meter". JOSA vol. 48, No. 12, pp. 985-995.
https://en.wikipedia.org/wiki/CIELAB_color_space.
Achanta, Radhakrishna; Shaji, Appu; Smith, Kevin; Lucchi, Aurelien; Fua, Pascal; Sosstrunk, Sabine, "SLIC Superpixels Compared to State-of-the-art Superpixel Methods", Journal of Latex Class Files, vol. 6, No. 1, Dec. 2011.
Cortes, C.; Vapnik, V, "Support-vector networks". Machine Learning vol. 20 (Issue 3): pp. 273-297 (1995).
Friedman, Jerome; Hastie, Trevor; Tibshirani, Robert (1998). Additive Logistic Regression: A Statistical View of Boosting, pp. 1-36.
Drucker, Harris; Burges, Christopher J. C.; Kaufman, Linda; Smola, Alexander J.; and Vapnik, Vladimir N. (1997); "Support Vector Regression Machines", in Advances in Neural Information Processing Systems 9, NIPS 1996, 155-161, MIT Press.
Y. Freund and R.E. Schapire (1999); "Introduction to Boosting", Journal of Japanese Society for Artificial Intelligence, 14 (5): 771-780.

* cited by examiner

MODEL-BASED METHODS AND APPARATUS FOR CLASSIFYING AN INTERFERENT IN SPECIMENS

RELATED APPLICATION

The This application claims priority to U.S. Provisional Application Ser. No. 62/117,263 entitled "MODEL-BASED METHODS AND APPARATUS FOR CLASSIFYING AN INTERFERENT IN SPECIMENS" filed on Feb. 17, 2015, the disclosure of which is hereby incorporated by reference in its entirety herein.

FIELD

The present invention relates to methods and apparatus for testing of specimens, and, more particularly, to methods and apparatus for determining a presence of an interferent in the specimen.

BACKGROUND

Automated testing systems may conduct assays using reagents to identify an analyte or other constituent in a specimen such as urine, blood serum, plasma, interstitial liquid, cerebrospinal liquids, and the like. For convenience and safety reasons, these specimens are almost universally contained within sample containers (e.g., sample tubes). The assay reactions generate various signals that may be manipulated to determine a concentration of analyte or other constituent in the specimen.

Improvements in automated testing technology have been accompanied by corresponding advances in pre-analytical sample preparation and handling operations such as sorting, batch preparation, centrifugation of sample containers to separate sample constituents, cap removal to facilitate fluid access, and the like by automated pre-analytical sample preparation systems called Laboratory Automation Systems (LASs). LASs may automatically transport specimen in sample containers to a number of pre-analytical sample processing stations.

These LASs may handle a number of different specimens contained in standard, bar code-labeled sample tubes. The bar code label may contain an accession number that may be correlated to demographic information that may be entered into a hospital's Laboratory Information System (LIS) along with test orders and other desired information. An operator may place the labeled sample containers onto the LAS system, which may automatically sort and route the sample containers for pre-analytical operations such as centrifugation, decapping, and aliquot preparation, and all prior to the specimen being subjected to clinical analysis by one or more analyzers that may also be part of the LAS.

For certain tests, a serum portion (obtained from whole blood by centrifugation) may be used. A serum separator may be added to the sample container to aid in the separation of the red blood cell portion from the serum portion in some cases. After centrifuging and a subsequent de-capping process, the sample container may be transported to an appropriate analyzer that may extract specimen from the sample container and combine the specimen with one or more reagents in a reaction vessel (e.g., cuvette). Analytical measurements may then be performed, often using a beam of interrogating radiation, for example, and by using photometric or fluorometric absorption readings, or the like. The measurements allow determination of end-point or rate values, from which an amount of analyte or other constituent related to be determined using well-known techniques.

Unfortunately, the presence of certain components (e.g., an interferent) in the specimen as a result of a patient condition or sample processing may adversely affect the accuracy of the results of the analyte measurement obtained from the analyzer. For example, an interferent in the specimen (e.g., serum), which may be unrelated to the patient disease state, may cause a different interpretation of the disease condition of the patient. Pre-analytical variables may include hemolysis (ruptured red blood cells), icterus (excessive bilirubin), and lipemia (high, visible lipid content).

Previously, the integrity of the serum of the specimen is visually inspected by a skilled laboratory technician. This may involve a review of the color thereof. A normal serum has a light yellow to light amber color. Alternately, a serum containing hemolysis may be quite reddish in color. An interferent may arise, for example, if an excess number of red blood cells are damaged, possibly during venipuncture, centrifugation, or after prolonged storage. When red blood cells are damaged, they release low density, reddish-colored hemoglobin into the specimen causing a reddish-color that is said to exhibit "hemolysis." When a hemoglobin concentration of the specimen exceeds about 20 mg/dl, the hemoglobin may interfere with the colorimetric determination of analyte in the analyzer due to the reddish color.

A sample containing icterus may be dark yellow or brown in color. Such an interferent may arise, for example, from an excess of bilirubin, the result of decaying red blood cells being converted in the spleen into bilirubin. Levels of bilirubin above 2-3 mg/dl are visibly yellowish and may, in particular, adversely affect an enzyme-based immunoassay testing in an analyzer. Such a condition is termed bilirubinaemia or icterus.

A sample containing lipemia may be whitish in color. Such an interferent may arise, for example, as a whitish appearance in serum due to the presence of excess lipids in the blood. Such a condition is called lipemia and lipid levels above about 50 mg/dl may interfere with antibody binding in the immunoassay and may accordingly affect the immunoassay result from the analyzer.

After centrifugation, when the red blood cell portion has been separated from the serum, a skilled technician may visually inspect the serum portion and, if judged to not have a normal light yellow to light amber color, the specimen may be discarded. Otherwise, the specimen will be analyzed as ordered. However, visual inspection is very subjective, labor intensive, and fraught with the possibility of human error. Thus, various methods have been implemented to ascertain whether hemolysis, icterus, and lipemia (frequently called "HIL") are present in the serum of the specimen.

Typically, a laboratory technician will assign a hemolytic index, an icteric index, and a lipemic index to the serum of the specimen based upon the color thereof. Based upon the value of the hemolytic index, the icteric index, and the lipemic index, the interpretation of the results from the analyzer can be evaluated. Alternately, if the value of one or more of the hemolytic index, the icteric index, and the lipemic index are too high, the specimen may be discarded without analysis by the analyzer or otherwise sent for remedial measures.

Because manual inspection is labor intensive, costly, and highly subjective, it is becoming increasingly important to evaluate the integrity of the specimen without the use of visual inspection by a laboratory technician. However, in some instances, bar code labels adhered directly to the sample container may partially occlude the specimen, so that there may not be clear opportunity to visually observe the serum of the specimen. One attempt to solve this problem involves optically viewing the serum of the specimen after the serum has been transferred to one of the cuvettes of the testing apparatus. However, this approach utilizes machine time of the analyzer, and, if the integrity of the specimen is compromised, additional machine time is wasted. Furthermore, this procedure cannot be used with clinical analyzers that add reagents to the cuvette prior to adding the serum.

Other systems, such as those described in US Pat. Pub. 2012/0140230 to Miller describes rotating the sample container to find a view window that is unobstructed by the label. However, such systems may be less prone to ease of automation.

Because of problems encountered when an interferent is contained within specimens to be clinically analyzed, there is an unmet need for a method and apparatus adapted to readily determine a presence of such an interferent. The method and apparatus should not appreciably adversely affect the speed at which analytical test results are obtained. Furthermore, the method and apparatus should be able to be used even on labeled sample containers where the label occludes some of the specimen.

SUMMARY

According to a first aspect, a method of determining a characteristic of a specimen contained within a sample container provided. The method includes generating a pixelated image of the specimen, determining color components for pixels in the pixelated image, classifying of the pixels in the pixelated image as being liquid or non-liquid, defining one or more liquid regions based upon the classifying of the pixels, and determining a presence of one or more interferent within the one or more liquid regions.

According to another aspect, an apparatus adapted to determine a characteristic of a specimen contained within a sample container is provided. The apparatus includes one or more image capture devices configured to capture one or more images of the specimen and at least a portion of the sample container and at least a portion of a label affixed to the sample container, if present, from which a pixelated image is generated, a liquid/non-liquid detector, based upon a liquid classification model, operable to classify the pixels in the pixelated image as being either liquid or non-liquid and define one or more liquid regions, a pixel classifier, based on a multi-class classification model, operable to determine for the pixels in the liquid region a classification as normal, hemolysis, icterus, or lipemia, and an interferent type detector operable to detect, based on a result of the pixel classifier, one or more interferent type within the one or more liquid regions.

In another aspect, a method of determining a characteristic of a specimen contained within a sample container is provided. The method includes generating a pixelated image of the specimen in the sample container at a quality control station in a first color space, converting the pixelated image from the first color space to a second color space, determining color components for pixels in the pixelated image in the second color space, classifying of the pixels in the pixelated image as being liquid or non-liquid based upon a liquid classification model, defining one or more liquid regions based upon the pixels that are classified as liquid pixels. classifying each of the liquid pixels as being one of normal, hemolysis, icterus or lipemia based upon a multi-class classification model, determining that the one or more liquid regions is either normal or includes one or more types of interferent based upon a number of the liquid pixels in each of normal, hemolysis, icterus or lipemia, and determining an interferent level for at least some of the one or more types of interferent based upon a regression model.

In another aspect, a testing apparatus adapted to determine a characteristic of a specimen in a sample container is provided. The testing apparatus includes a plurality of image capture devices arranged around the specimen and configured to capture multiple images of the specimen and at least a portion of the sample container and at least a portion of a label affixed to the sample container, if present, from multiple viewpoints, from which a pixelated image is generated, a liquid/non-liquid detector, based upon a liquid classification model, operable to classify each pixel in the pixelated image as being either liquid or non-liquid and define one or more liquid regions, a pixel classifier, based on a multi-class classification model, operable to determine for pixels in the liquid region a classification as normal, hemolysis, icterus, or lipemia, and an interferent type detector operable to detect, based on a result of the pixel classifier, one or more interferent type within the one or more liquid regions.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

BRIEF DESCRIPTION OF THE DRAWINGS

The drawings, described below, are for illustrative purposes only and are not necessarily drawn to scale. The drawings are not intended to limit the scope of the invention in any way.

DESCRIPTION

Figure 1:
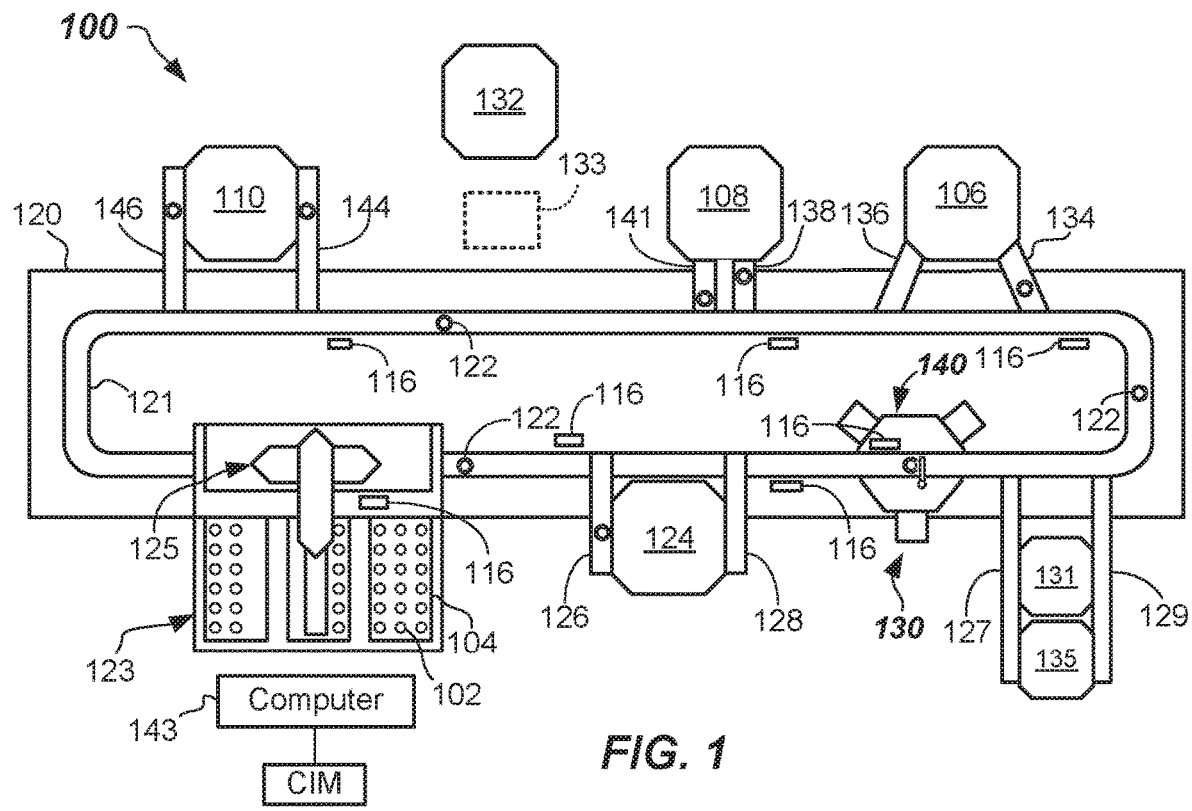
FIG. 1 illustrates a top view of an automated specimen testing system including one or more pre-analytical specimen quality stations and one or more analyzers according to one or more embodiments.

In a first broad aspect, embodiments of the present invention provide methods and apparatus for determining if one or more interferent is present in a specimen (e.g., liquid specimen) or whether the specimen is normal. "Interferent," as used herein, shall mean and include any serum variable, any disease condition, and/or any opacity, coloration, or particulate that may affect the interpretation of results of testing in an analyzer.

The method may be carried out as a pre-analytical method prior to the specimen being presented to an analyzer for analysis. In particular, one or more embodiments of the present invention provide for delivering a specimen for analytical analysis after being pre-inspected for a presence of one or more interferent at a specimen quality station. Subsequent to a centrifuging procedure, a serum portion of the specimen may be tested for the presence of an interferent, such as hemolysis, icterus, and/or lipemia (hereinafter "HIL"). If the serum portion is found to be free of interferent, the specimen is allowed to continue on, and undergo routine analytical analysis by one or more analyzers. Specimen quality station may be on a conveyor track in some embodiments and test for presence of one or more interferent as the specimen passes by.

If the specimen is found to contain more than a predefined amount of lipemia, the specimen may then be rejected or optionally sent for remediation. For example, if the specimen is found to contain lipemia, then the specimen may then be subjected to a special pre-processing operation adapted to reduce an amount of lipemia therein. The specimen may then be allowed to be routinely analyzed or possibly retested for the presence of an interferent after the special pre-processing.

If the specimen is found to contain more than a predefined amount of hemolysis, then the specimen may be allowed to continue and be routinely processed for analytical analysis. However, the extent or degree of hemolysis may be reported along with the analytical results. Alternatively, the hemolyzed specimen may be subjected to a more sophisticated determination of the amount of hemolysis so that any analytical tests to be conducted on the specimen that are not affected by the presence of hemolysis may be routinely completed. If the hemolyzed specimen includes an amount of hemolysis above a predefined amount, and the test to be conducted will be affected thereby, then a redraw of a fresh specimen may be ordered and undertaken.

If the specimen is found to contain more than a predefined amount of icterus, then the specimen may be allowed to be routinely processed for analytical analysis and the extent or degree of icterus may be reported along with the analytical results.

In general, if an interferent is found to exhibit and interferent level (e.g., index) that is sufficiently high, the lab technician may remove the specimen from the testing apparatus and request a new sample of blood from that particular patient.

Embodiments of the invention provide a method of determining a characteristic of a specimen (e.g., presence of an interferent) in a sample container. The method includes generating a pixelated image of the specimen (e.g., using an image capture device, such as a digital camera, or the like), classifying of pixels in the pixelated image as being liquid or non-liquid, defining a liquid region based upon the classification of the pixels, and determining a presence of an interferent within the liquid region.

Processing of the captured pixelated image may be based upon L*a*b color space, wherein color components (a-value and a b-value) for pixels are generated. Classifying of pixels in the pixelated image as being liquid or non-liquid may be based upon a first model (e.g., a liquid classification model) that may be generated from multiple training sets. The pixels may then be classified as being normal (N), or as containing an interferent, such as hemolysis (H), icterus (I), or lipemia (L), using a second model (e.g., a pixel classification model) in some embodiments. Based upon the pixel classification results, an interferent type for the liquid region as a whole may be determined. An interferent level for the determined interferent type may also be provided. The interferent level may be based upon a third model (e.g., a regression model) in some embodiments. The regression model may be trained for each interferent type based upon sample specimens that exhibit diverse interference levels. More than one interferent type may be determined by the method, and an interferent level for each determined interferent type may be specified.

Testing apparatus for carrying out the method are provided, as are other aspects. These and other aspects and features of embodiments of the invention are provided with reference to FIGS. 1-5 herein.

Figure 2:
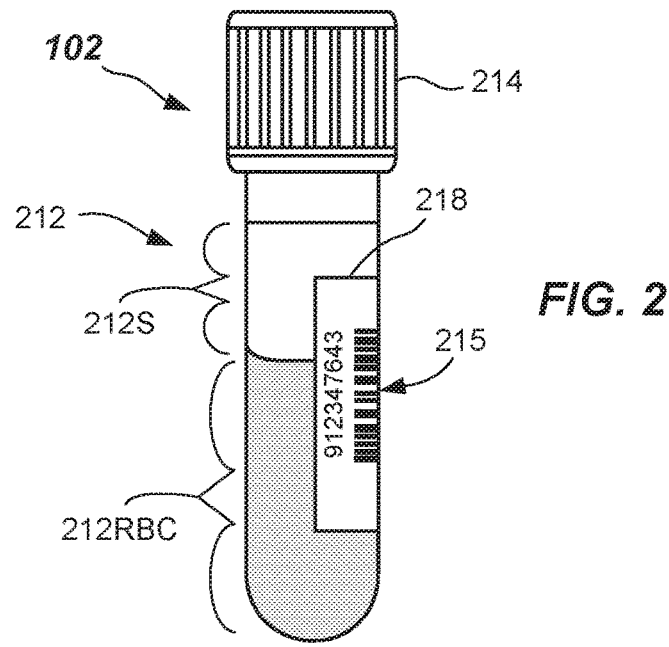
FIG. 2 illustrates a side view of a labeled sample container including a centrifuged specimen, which may be analyzed for a presence of an interferent according to one or more embodiments.

FIG. 1 shows an automated specimen testing system 100 capable of automatically pre-processing multiple ones of the sample containers 102 (e.g., test tubes or blood collection tubes—see FIG. 2), that may be contained in one or more sample racks 104 prior to analysis by one or more analyzers (e.g., first, second, and third analyzer 106, 108, 110, respectively). Optionally, the sample container 102 may be any generally clear or transparent container, such as a sample cup, cuvette, or other clear glass or plastic container. Typically, specimens 212 to be automatically processed may be provided to the automated specimen testing system 100 in the sample containers 102, which may be capped with a cap 214 (FIG. 2). Each of the sample containers 102 may be provided with identification information 215, such as a bar code, alphabetic, numeric, or alphanumeric indicia, that may be machine readable by one or more sensors 116 (e.g., barcode readers). The identification information 215 may indicate a patient's identification as well as the assay procedures to be accomplished upon the specimen 212 therein, for example. Such identification information 215 may be generally provided on a label 218 adhered to, or otherwise provided on the side of, the sample container 102. The label 218 generally does not extend all the way around the sample container 102, or all along a length of the sample container 102. Accordingly, although the label 218 may occlude some portion of the specimen 212, some portion may still be viewable. In some embodiments, the sample racks 104 may have additional identification information thereon.

Automated specimen testing system 100 may include a base 120 (e.g., a frame or other structure) upon which a conveyor track 121 (which may be a collection of conveyor belts, chains and platforms, or the like) or other suitable conveyance mechanism may be mounted. Conveyor track 121 may transport individual ones of the sample containers 102 that may be carried on the conveyor track 121 in sample container carriers 122 (e.g., single specimen carrier pucks). Sample container carriers 122 may leave from a sample container load/unload station 123 having one or more sample racks 104, a robot 125 configured to grasp the sample containers 102 from the sample racks 104 and load the sample containers 102 into the sample container carriers 122 on an input lane of the conveyor track 121, and remove sample containers 102 upon completion of testing. Upon being loaded onto conveyor track 121, the sample containers 102 carried by sample container carriers 122 progress to a centrifuge 124 (e.g., an automated centrifuge) and may be diverted to the centrifuge 124 by inflow lane 126. After being centrifuged, the sample containers 102 may exit on outflow lane 128 and continue on the conveyor track 121 to a specimen quality station 130 to be further described herein with reference to FIGS. 3A and 3B.

The specimen quality station 130 includes a testing apparatus 140 that is configured and adapted for automatically determining a presence of one or more interferent in the specimens 212 to be automatically processed by the automated specimen testing system 100. If found to contain no interferent (e.g., be normal), the specimens 212 may continue on the conveyor track 121 and then may be analyzed in the one or more analyzers (e.g., first, second and third analyzers 106, 108, and/or 110) before returning each sample container 102 to the sample container load/unload station 123 for offloading. It should be understood that more or less than three analyzers may be linked by the conveyor track 121 but, for purposes of illustration, three are shown.

Additionally, a remote analyzer 132 may be serviced by the automated specimen testing system 100 even though the remote analyzer 132 is not directly linked to the automated specimen testing system 100. For instance, an independent robot 133 (shown dotted) may carry sample containers 102 containing specimens 212 to the remote analyzer 132 and return them after testing. Optionally, the sample containers 102 may be manually removed and returned. Remote analyzer 132 may test for a hemolysis level, for example. Other testing may be accomplished on remote analyzer 132.

The automated specimen testing system 100 may include a number of sensors 116 at one or more locations. Sensor 116 may detect a location of sample containers 102 along the conveyor track 121 by means of reading the identification information 215 (FIG. 2) placed on the sample container, or like information (not shown) on each sample container carrier 122. In some embodiments, a distinct RFID chip may be embedded in each sample container carrier 122 and conventional RFID reader system may be employed in the tracking operation, for example. Other means for tracking the location may be used, such as proximity sensors.

Centrifuge 124 and each analyzer 106, 108, 110 may be generally equipped with robotic mechanisms and/or inflow lanes (e.g., inflow lanes 126, 134, 138, 144) configured to remove sample container carriers 122 from the conveyor track 121, and robotic mechanisms and/or outflow lanes (e.g., outflow lanes 128, 136, 141 and 146) configured to reenter a sample container carrier 122 from the conveyor track 121.

The load/unload station 123 may include a robot 125 including one or more (e.g., least two) robot arms or components capable of X and Z, Y and Z, or X, Y, and Z motion, wherein the robot 125 may be equipped with robotic clamping hands or fingers adapted to pick up and place the sample containers 102. However, any suitable type of robot 125 may be used.

Automated specimen testing system 100 may be controlled by a computer 143, preferably a microprocessor-based central processing unit CPU, having a memory and suitable conditioning electronics and drivers for the system components. Computer 143 may be housed as part of, or separate from, the base 120 of the automated specimen testing system 100. The computer 143 may operate to control movement of the sample container carriers 122 to and from the load/unload station 123, the centrifuge 124, specimen quality station 130, and each analyzer 106, 108, 110 carrying out various types of testing (e.g., assay processing) as described below.

For all but the specimen quality station 130, the computer 143 may control the automated specimen testing system 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the automated specimen testing system 100 may be used. The control of the specimen quality station 130 may also be provided by the computer 143 according to an inventive model-based method, as will be described in detail herein.

Embodiments of the present invention may be implemented using a computer interface module (CIM) that allows for a user to easily and quickly access a variety of control screens and status display screens. These control and display screens may describe some or all aspects of a plurality of interrelated automated devices used for sample preparation and analysis of specimens 212. Such a CIM may employ a first display screen that is directly linked to a plurality of additional display screens containing on-line information about the operational status of a plurality of interrelated automated devices as well as information describing the location of any specific specimen 212 as well as a status of tests to be performed on, or being performed on, the specimen 212. The CIM is thus adapted to facilitate interactions between an operator and automated specimen testing system 100. The CIM may include a visual touch screen adapted to display a menu including icons, scroll bars, boxes, and buttons through which the operator may interface with the automated specimen testing system 100. The menu may comprise a number of function buttons programmed to display functional aspects of the automated specimen testing system 100.

FIG. 2 illustrates a plan view of a sample container 102 that has undergone centrifugation at centrifuge 124 to separate out a serum portion 212S from a red blood cell portion 212RBC. As shown, the label 218 may occlude some of the serum portion 212S, so that visualization of the serum portion 212S by conventional imaging is difficult. Embodiments of the invention can account for this, and without having to rotate the sample container 102. Thus, analysis for an interferent in the specimen 212 may occur as the sample container 102 stops at or even just passes by the testing apparatus 140 on the conveyor track 121.

Figure 3A:
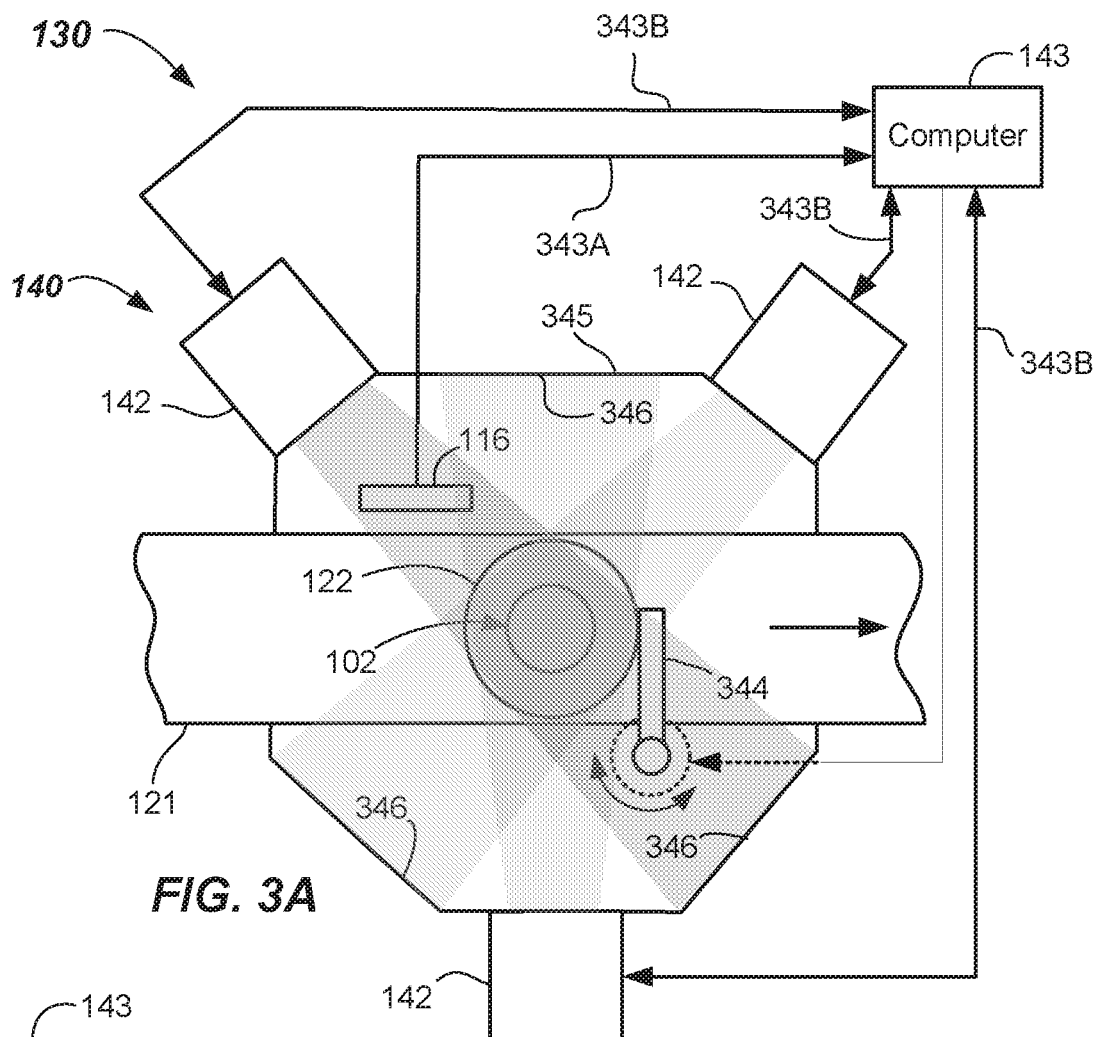
FIG. 3A illustrates a schematic top view of a testing apparatus adapted to automatically analyze for a presence of an interferent according to one or more embodiments.
Figure 3B:
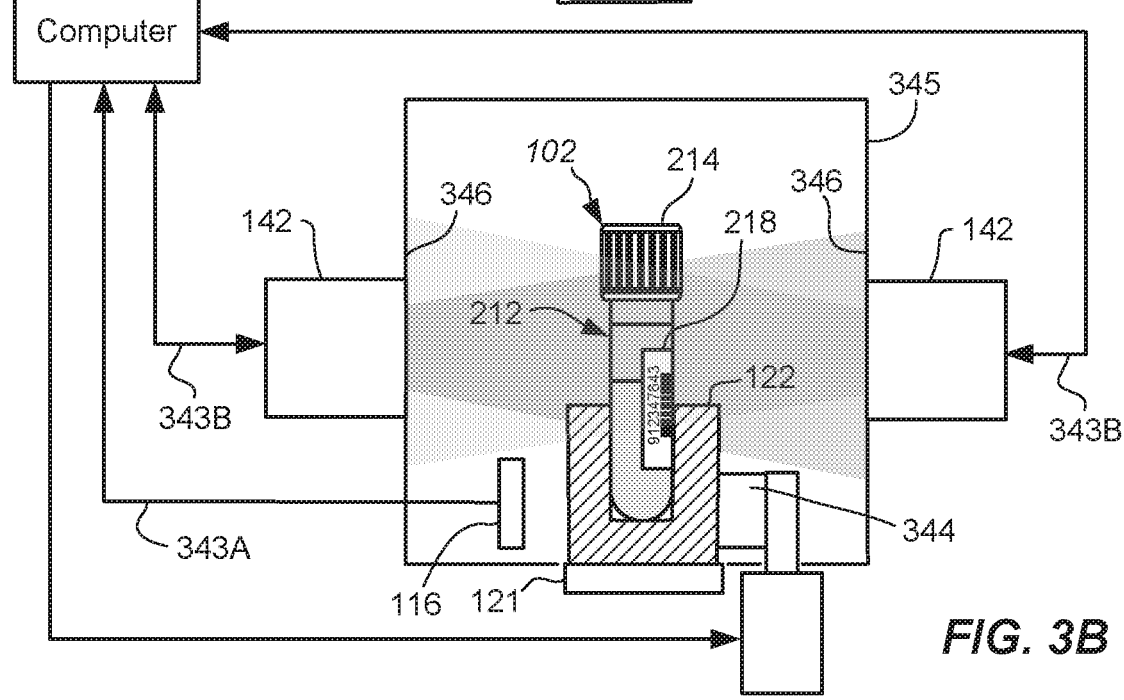
FIG. 3B illustrates a schematic side view of the testing apparatus of FIG. 3A according to one or more embodiments.

In FIGS. 3A-3B, a first embodiment of a testing apparatus 140, which may be used at the specimen quality station 130 of FIG. 1, is provided. Testing apparatus 140 may be configured and adapted to automatically determine a presence of one or more interferent in a specimen 212 (e.g., in a serum portion 212S thereof). The presence of the interferent may be detected by the testing apparatus 140 at the specimen quality station 130 prior to being automatically processed by one or more of the analyzers 106, 108, 110. In this manner, if the specimen 212 includes an interferent, additional processing, discarding, or a redraw may take place, and without wasting valuable analyzer resources.

Additionally, other detection methods may take place on the specimen 212 contained in the sample container 102 at the testing apparatus 140, as well as on the sample container 102 itself. For example, the testing apparatus 140 may be used to determine certain physical dimensional characteristics of the specimen 212 (e.g., the location of a liquid-air interface, location of an interface between the red blood cell portion 212RBC and the serum portion 212S, a height of the red blood cell portion 212RBC relative to a datum, and a height of the serum portion 212S relative to a datum, and/or certain physical dimensional characteristics such as height or width of the sample container 102, or a color of the cap 214.

Now referring to FIGS. 1, 3A and 3B, the testing apparatus 140 may include one or more image capture devices 142, such as conventional digital cameras, charged coupled devices (CCD), an array of photodetectors, CMOS sensors, spectrophotometers, or the like. Each image capture device 142 may be any device capable of capturing a digital image. Image capture devices 142 may be operable to capture images of at least a portion of the sample container 102, and including at least a portion of the specimen 212, and possibly capture a part of the label 218. Image capture device 142 may capture a part of the sample container carrier 122, such as a datum thereof (e.g., a top thereof or a mark thereon). In the embodiment shown, a plurality of image capture devices 142 are arranged around the specimen 212 and configured to capture images of the specimen 212 and at least a portion of the sample container 102 and at least a portion of a label 218 affixed to the sample container 102, if present, from multiple viewpoints, from which a pixelated image 350 (FIG. 3D) is generated. Other arrangements of the plurality of image capture devices 142 may be used.

The image capture devices 142 may be provided in close proximity to and trained or focused to capture an image window, i.e., an area including an expected location of the serum portion 212S in the sample container 102, and possibly part of the red blood cell portion 212RBC, and possibly the datum. Each captured image, that may be triggered and captured responsive to a triggering signal in communication line 343A, may be received by the computer 143 in communication line 343B and may be processed according to one or more embodiments of the method provided herein. Each of the captured images from each image capture device 142 may be consolidated and fused as one pixelated image 350 (FIG. 3D). Each respective image may be truncated to remove immaterial portions before concatenation.

In some instances, a gate 344 may be provided to stop the sample container carrier 122, so that one or more good quality images may be obtained, which may be used to generate the pixelated image 350 (FIG. 3D). "Pixelated image" as used herein means an image containing pixels (e.g., a digital image). Pixels may be individual pixels or superpixels. Each captured image may include a pixel resolution of about 700 pixels×2500 pixels, and the pixelated image 350, as combined, may contain about 2500 pixels×2500 pixels, for example. Other pixel densities may be used. One or more sensors 116 may be used to determine a presence of the sample container carrier 122 at the specimen quality station 130 and send the trigger signal in communication line 343A to trigger the image capture devices 142. In another embodiment, one or more sensors 116 may be used to determine the presence of the sample container carrier 122 at the specimen quality station 130, but the sample container carrier 122 may not be stopped, i.e., there is no gate 344. In this embodiment, the image capture devices 142 may be fast-acting digital cameras capable of capturing images as the sample container carrier 122 passes by on the conveyor track 121.

In each case, digital images are captured responsive to the triggering signal in communication line 343A and the images may be stored in memory of the computer 143. Then, the pixelated image 350 is constructed from the captured images from various viewpoints and the pixelated image 350 may be analyzed according to embodiments of the invention to determine a presence of one or more interferent, and possibly one or more of: 1) certain dimensional characteristics of the sample container 102, and/or 2) certain dimensional characteristics of the specimen 212.

The testing apparatus 140 may include a housing 345 that may at least partially surrounding the conveyor track 121, and the sample container 102 may be located inside the housing 345 during testing. Testing apparatus 140 may include backstops 346 to provide improved image contrast. Backstops 346 may be any suitable color other than the expected range of color of the specimen 212. In some embodiments, a black colored material may be used.

Testing apparatus 140 may further optionally include a light source (not shown) for providing illumination of the sample container 102. Light source may be any suitable source, such as a non-collimated visible light (e.g., white light), that may direct a beam of light onto the sample container 102. A diffuser may be provided to shape and obtain a uniform field of light radiation from the light source. Light source and diffuser may serve to properly illuminate the sample container 102 to improve a quality of the image capture results (e.g., for a determination of HIL).

The pixelated image 350 may be analyzed using the methods provided herein. In particular, the pixelated image 350 may be analyzed by image processing program described below and contained on the computer 143 to determine the presence of one or more interferent in the specimen 212 and possibly other dimensional features, as described herein.

Hemolysis Detection

According to first broad aspect, embodiments of the invention are directed at a method and apparatus that may be used to detect a hemolyzed specimen 212 contained in a sample container 102 of centrifuged blood. The method utilizes an image capture device (e.g., a digital camera) for electronic (digital) image capture of a pixelated image, and then analyzes the pixelated image to detect hemolysis.

Hemolysis is a sample quality discoloration issue, and it cannot be resolved with special processing. Hemolysis (also spelled haemolysis) may occur when the red blood cells rupture and the hemoglobin inside is released into the serum portion 212S of the specimen 212 that has been centrifuged. This gives the serum portion 212S a reddish color or appearance. Along with a reddish color, potassium may be released into the serum portion 212S, which may give erroneous results when tested on an analyzer 106, 108, and/or 110. Incorrect blood collection, handling, storage, and/or processing may cause hemolysis.

The extent of hemolysis is characterized by a Hemolytic level or hemolytic index. "Hemolytic index" as used herein shall mean a grade given to a particular specimen based upon the determined content of hemolysis present in the specimen 212. Generally, the grading scale for observation ranges from zero through four (0-4). Zero represents substantially no hemolysis while four represents significant hemolysis. Alternately, the scale could be 0-10, 0-20, A-F, or some other range.

A specimen 212 having a sufficiently high hemolytic index, as determined by the testing apparatus 140, may be rejected. A usual procedure is to redraw another specimen 212 from the patient to ensure that a specimen 212 of good quality presented to the analyzer 106, 108, and/or 110. Thus, the specimen 212 exhibiting hemolysis may be rejected and offloaded at sample load/unload station 123 without being further tested.

Once a new specimen 212 is processed, and is deemed to be normal by testing apparatus 140, it may be successfully analyzed without the interfering hemoglobin. Thus, in another embodiment of the invention, the testing apparatus 140 can detect the presence of hemolysis in the specimen 212 at the specimen quality station 130 130. An alert may be displayed on a display (e.g., computer screen) of the computer 143 of the automated specimen testing system 100 to alert lab personnel for further evaluation and/or decision making.

To improve an ability to convey the assessment of a specimen 212 containing hemolysis to laboratory personnel, an image of the sample container 102 including the specimen 212 having hemolysis may be displayed. This image may be displayed along with other collaborative information such as, but not limited to, reference images of various known hemolyzed specimens, color spectra for comparison, sample's assessed level of hemolysis, and/or suggested laboratory personnel action to take. In some embodiments, if a hemolyzed specimen 212 is detected at specimen quality station 130, the specimen 212 may be sent on to an analytical instrument (e.g., a specialized clinical analyzer 135—FIG. 1) where a precise level of hemolysis can be measured and characterized.

Icterus Detection

According to another broad aspect, embodiments of the invention are directed at a method and apparatus that may be used to detect icterus in a specimen 212 contained in a sample container 102 of centrifuged blood. An icterus interferent may arise, for example, from an excess of bilirubin, the result of decaying red blood cells being converted in the spleen into bilirubin. Levels of bilirubin above 2-3 mg/dl are generally visibly yellowish or brownish in color and may, in particular, adversely affect enzyme-based immunoassays carried out on the analyzers (e.g., analyzers 106, 108, and/or 110). Such a condition is also termed bilirubinaemia.

The icterus detection method is similar to that for detecting hemolysis. The method may first receive the sample container 102 in the testing apparatus 140. Next, image capture device 142 adapted for digital electronic image capture may capture a pixelated image of the specimen 212. The computer 143 may then perform an analysis of the pixelated image for the presence of icterus in accordance with the method described herein below. According to the method, the same digital image that was taken for the hemolysis detection may be used for icterus detection. The analysis may determine an interferent level, such as an icteric index. "Icteric index" as used herein shall mean the grade given to a particular specimen 212 based upon the determined content of icterus present. Generally, the grading scale for observation ranges from zero through four (0-4). Similarly, zero represents substantially no icterus, while four represents significant presence of icterus. Alternately, the scale could be 0-10, 0-20, A-F, or some other range.

Lipemia Detection

According to another broad aspect, embodiments of the invention are directed at a method and apparatus that may be used to detect lipemia in a specimen 212 contained in a sample container 102 of centrifuged blood. A lipemia interferent, which may exhibit a whitish appearance in serum, may arise from the presence of excess lipids in the blood. Lipid levels above about 50 mg/dl may interfere with antibody binding in immunoassay testing and may accordingly affect an immunoassay result from the analyzer.

The lipemia detection method is similar to that for detecting hemolysis and icterus. The method may receive the sample container in the testing apparatus 140. Next, image capture device 142 adapted for digital electronic image capture may capture a pixelated image of the specimen 212. The computer 143 may then perform an analysis of the captured image for the presence of lipemia in accordance with the method described herein below. According to the method, the same digital image that was taken for the hemolysis and icterus detection may be used for lipemia detection. The analysis may determine an interferent level, such as a lipemic index. "Lipemic index" as used herein shall mean the grade given to a specimen 212 based upon the determined content of lipemia therein. Generally, the grading scale for visual observation ranges from zero through four (0-4). Similarly, zero represents substantially no lipemia, while four represents significant presence of lipemia. Alternately, the scale could be 0-10, 0-20, A-F, or some other range.

Lipemia is a specific sample quality discoloration defect, which may be resolved with special processing before the specimen 212 is tested or analyzed on an analyzer (e.g., analyzer 106, 108, 110). After the lab is aware the specimen is lipemic, they may further process the specimen 212 at a remediation station 131 to remove or reduce the lipids. For example, they may introduce a solvent or other material to reduce the amount of lipemia. Once this is complete, the specimen 212 can be properly analyzed by one or more of the analyzers (e.g., analyzer 106, 108, 110) and the lab will be relatively more confident of the test results.

After the specimen 212 is corrected or additionally processed, it can be returned to the conveyor track 121 and placed directly on an analyzer (e.g., analyzer 106, 108, 110) for analysis. In some embodiments, the automated specimen testing system 100 may be able to perform this corrective action or additional processing on the specimen 212 without user interaction. For example, the routing of the lipemic specimen would remove the specimen 212 via inflow 127, perform additional processing at remediation station 131 as a prerequisite to analysis on the analyzer (e.g., analyzer 106, 108, 110), and then return the specimen 212 on outflow 129.

Thus, it should be apparent that embodiments of the invention may detect HIL at the first possible instance (e.g., at the specimen quality station 130) after centrifugation of the specimen 212. By detecting HIL at this point in the process, the specimen 212 will not be wasted, erroneous test results will be prevented, and any patient test result delay will be minimized.

With reference to FIGS. 3A-3E, 4 and 5, embodiments of the invention directed at a method and functional components of the testing apparatus 140 are provided. The method 500 (FIG. 5) and testing apparatus 140 (FIG. 4) are adapted to determine a characteristic of the specimen 212 contained within the sample container 102, as will now be described in detail. The method 500 comprises capturing a pixelated image 350 of the specimen 212 in 502. The pixelated image 350, which may be stored in digital format in memory of the computer 143 (FIGS. 3A-3B), comprises, in one embodiment, a collection of pixel information consolidated from the images captured with the image capture device 142 (see also FIG. 3A-3B). The pixelated image 350 may include multiple consolidated views (e.g., three views shown) of the sample container 102 taken from different viewpoints.

Figure 3C:
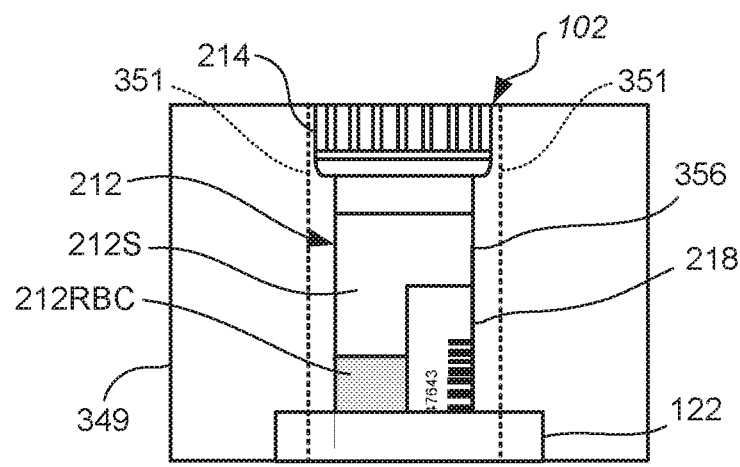
FIG. 3C illustrates a schematic view of an image window including an image captured by an image capture device according to one or more embodiments.
Figure 3D:
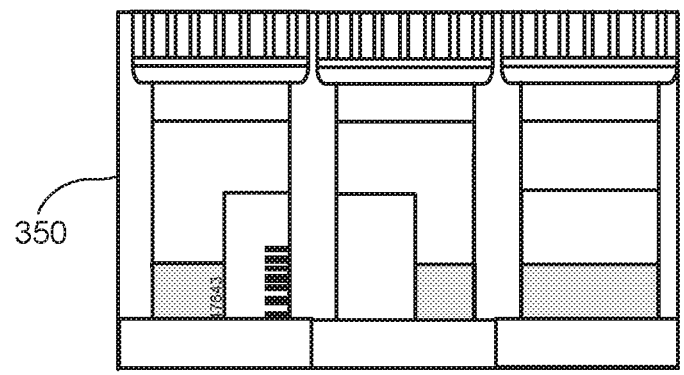
FIG. 3D illustrates a schematic view of an example pixelated image according to one or more embodiments.

Specimen 212 may be contained within the sample container 102, and the captured images may be restricted to a predefined image window 349 (e.g., a certain frame size as shown in FIG. 3C). The predefined image window 349 may be based upon the size of the sensor (e.g., CMOS or CCD sensor) used in the image capture device 142, but also may be limited by a mask of a certain size formed in the housing 345 proximate each image capture device 142. Mask may be part of the lens of the image capture device 142 in some embodiments. Mask may provide areas in the image that can be discarded immediately, thus reducing a size of the captured image so that there are fewer pixels to process. From each of the captured images in image window 349, a portion may be cropped along dotted lines 351 shown in FIG. 3C, and consolidated, combined or fused to generate pixelated image 350 shown in FIG. 3D. In some embodiments, the cap 214 may be removed (sample container 102 is de-capped after centrifuging).

The method 500 then processes and analyzes the pixelated image 350 to determine a presence of an interferent within the specimen 212. For example, in one embodiment, the method 500 is directed at determining a presence of an interferent, such as hemolysis, icterus, and/or lipemia (HIL) in the serum portion 212S of the specimen 212.

The method 500 may process the pixelated image 350, which may be initially captured in a first color space such as Red-Green-Blue (RGB) color space, for example. Other first color spaces may be used for the image capture. RGB color space images may include a hue or level value for each of the R, G, and B color components, such as a level between about 0 and 256, for example. A particular color may be represented by numbers corresponding to each of the RGB components (e.g., (R125, G97, B203)). RGB includes sRGB and may include gamma correction, for example. Other optional first color spaces that may be used are Luma plus Chroma color space, or Hue and Saturation (HSL and HSV) color space, for example.

Image processing methods such as gamma correction may be applied to the pixelated image 350, before converting the first color space (e.g., RGB image) to a second color space, such as L*a*b color space, Luma plus Chroma color space, or Hue and Saturation (HSL and HSV) color space to enhance image contrast by compensating the various lighting conditions. Gamma correction is described in a book entitled "Digital Video and HDTV: Algorithms and Interfaces" by Charles A. Poynton (2003), for example.

In some embodiments, the pixelated image 350 may be converted from the first color space (e.g., RGB color space) to a second color space. From the pixelated image 350, the color components may be determined. For example, the second color space may be L*a*b color space. L*a*b color space includes a luminescence value (L), an a-value, and a b-value, where the a-value and b-value are color components. Conversion to L*a*b color space from RGB color space is disclosed in International Commission on Illumination (CIE) in 1976.

In 504, a determination is made of the color components for the pixels in the pixelated image 350. If converted, the determination of the color components takes place after conversion. Conversion may include determining color components, such as an a-value and a b-value for pixels in the pixelated image 350 in L*a*b color space. The L value may not be used in embodiments of the method 500 provided herein. Thus, the conversion from the first color space to L*a*b color space may involve only determination of the a-values and b-values. These a-values and b-values for the pixel may be stored in the memory of the computer 143.

The method 500 further includes, in 506, classifying pixels in the pixelated image 350 as being either liquid or non-liquid. The classifying as being liquid or non-liquid may be accomplished by a liquid/non-liquid detector 454, which may include a liquid classification model 455, which may be made up of programmed instructions executable on the computer 143 that operate to break or separate the pixels in the pixelated image 350 into classes (e.g., liquid and non-liquid). Liquid classification model 455 may be any suitable type of supervised classification model that is linear or non-linear may be used. For example, the liquid classification model 455 may be a support vector machine (SVM) that is either linear or kernel-based. Optionally, liquid classification model 455 may be a boosting classifier such as an adaptive boosting classifier (e.g., AdaBoost, LogitBoost, or the like), any artificial neural network, a tree-based classifier (e.g., decision tree, random decision forests), and logistic regression as a classifier, or the like. SVM may be particularly effective for classification between liquid and non-liquid. A SVM is a supervised learning model with associated learning algorithms that analyzes data and recognizes patterns. SVMs are used for classification and regression analysis.

Multiple sets of training examples are used to train the liquid classification model 455, and then the pixels are passed through the liquid classification model 455 and are marked as belonging to one of two categories (liquid or non-liquid). An SVM training algorithm builds the liquid classification model 455 that assigns any new examples into one category or the other. Thus, the liquid classification model 455 may be a non-probabilistic linear classifier in some embodiments. The SVM model represents examples as points in space that are mapped so that the examples of the separate liquid/non-liquid categories are divided by a clear gap that is as wide as possible. New pixels from the pixelated image 350 may be mapped into that same space and predicted to belong to a particular class (liquid or non-liquid) based on which side of the gap they fall on. In some embodiments, SVMs can efficiently perform a non-linear classification using what is called a kernel trick (e.g., kernel-based SVM classifier), implicitly mapping their inputs into high-dimensional feature spaces. SVM (Gaussian Kernel) and boosting are particularly preferred. Other types of classification models may be used.

The liquid classification model 455 takes the pixelated image 350 that has been converted to L*a*b space and then subjects the pixels to the model map of the liquid classification model 455. The result is that each pixel passed through the liquid classification model 455 is classified as being either liquid or non-liquid. The liquid classification model 455 may be trained by graphically outlining liquid regions 356 in a multitude of examples of sampled containers 102 having various specimen conditions, occlusion by label 218, levels of serum portion 212S and red blood cell portions 212RBC, and the like. As many as 500 or more images may be used for training the liquid classification model 455. Each training image may be outlined manually to identify and teach the liquid classification model 455 which areas are liquid versus non-liquid.

Figure 3E:
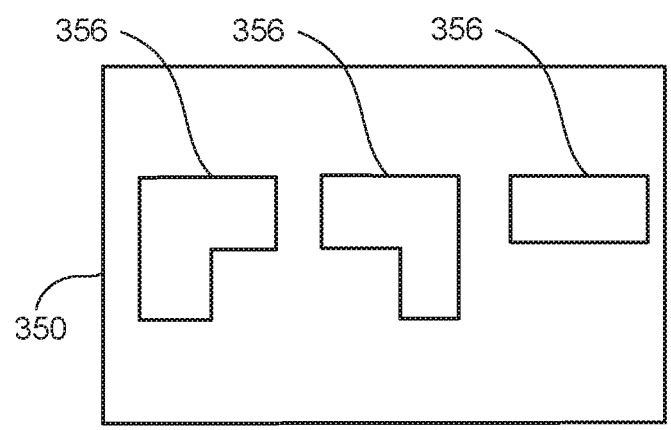
FIG. 3E illustrates a schematic view of example liquid regions extracted from the pixelated image according to one or more embodiments.
Figure 4:
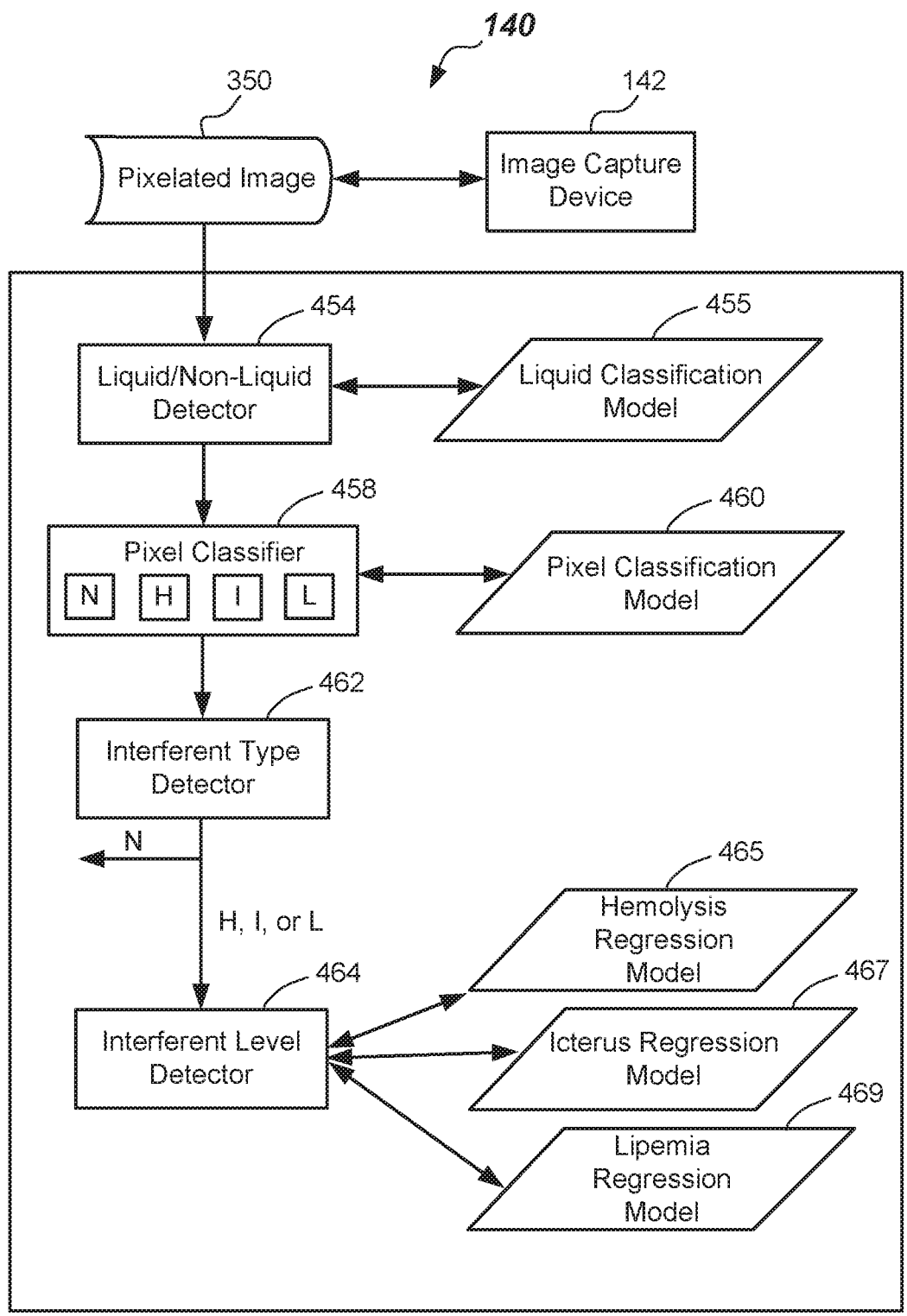
FIG. 4 is a block diagram of functional components of a testing apparatus adapted to determine a characteristic of a specimen in a sample container according to one or more embodiments.
Figure 5:
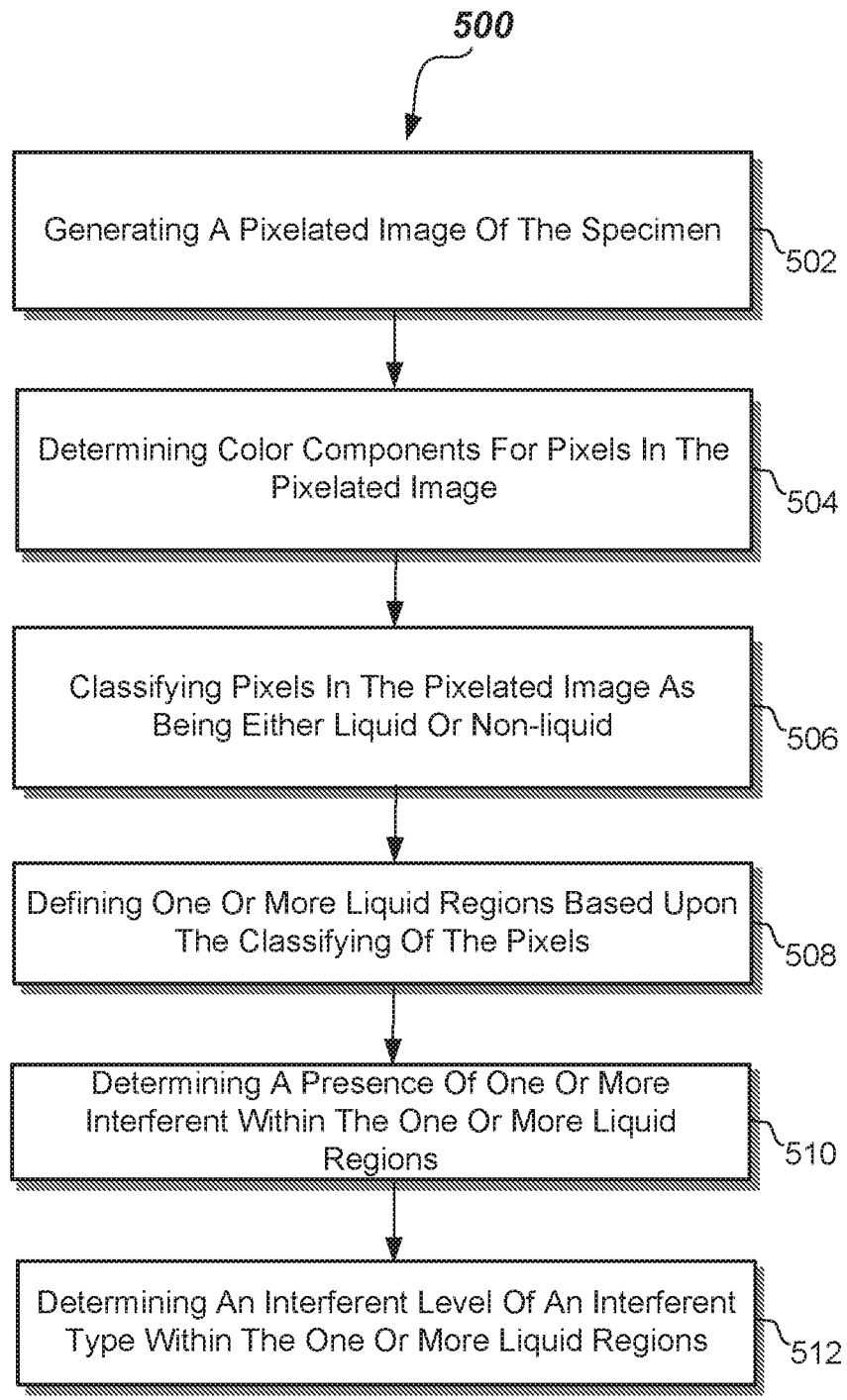
FIG. 5 is flowchart of a method adapted to determine a presence of an interferent within a specimen according to one or more embodiments.

As shown in FIG. 3E, and, in 508, after feeding the pixels through, liquid classification model 455 provides a result defining one or more liquid regions 356 based upon the classifying of the pixels. One or more liquid regions 356 are defined by all the pixels that are deemed to be liquid by the liquid classification model 455. All portions of the pixelated image 350 that are classified as non-liquid, such as portions of the sample container 102, cap 214, label 218, red blood cell portion 212RBC, and sample container carrier 122 may not further processed for determining the presence of an interferent, but may be further processed for other reasons as will be discussed herein below.

Once each pixel is classified as liquid or non-liquid by the liquid/non-liquid detector 454 using the liquid classification model 455, the method 500, in 510, determines a presence of one or more interferent within the one or more liquid regions 356. In one or more embodiments, the determination of the presence of one or more interferent involves first analyzing the pixels to characterize individual ones of the pixels as being either normal (N), or containing Hemolysis (H), Icterus (I) or Lipemia (L). From this determination, an overall classification of the one or more liquid regions 356 is provided. The overall classification may be as being normal (N) or including a particular type or types of interferent. For example, the particular interferent type in the one or more liquid regions 356 may be determined to be one of H, I, and/or L.

As with the liquid/non-liquid detector 454, a pixel classifier 458 also may include any suitable supervised classification model as discussed above. Pixel classifier 458 may utilize a pixel classification model 460 to determine whether the pixels that are classified as a liquid are one of the classes of N, H, I, or L. The pixel classification model 460 may be based on a multi-class classification model that has been sufficiently trained based on multiple interferent training sets. The multi-class classification model (e.g., a four class classification model) may be a support vector machine (SVM), support-vector network, or a boosting class algorithm. Examples of support vector machines and networks are described in a paper entitled "Support-vector Networks" by C. Cortes and V. Vapnik in Machine Learning Vol. 20, Issue 3, page 273-297, and in a paper entitled "Additive Logistic Regression: A Statistical View of Boosting" by J. Friedman, T. Hastie, R. Tibshirani (1998), and "A Short Introduction to Boosting" by Y. Freund and R. E. Schapire (1999).

Once the pixels have been classified as being N, H, I, or L by the pixel classifier 458, the method 500 includes determining whether the one or more liquid regions 356 of the specimen 212 is, as a whole, normal (N), or if not normal (N), characterizing the interferent type of the liquid region 356, as a whole, using Interferent type detector 462. If the specimen 212 is deemed to be normal (N) by the interferent type detector 462, then the specimen 212 simply progresses on the conveyor track 121 to an analyzer (e.g., analyzer 106, 108, and/or 110) for which tests were ordered. If non-normal, then the interferent type detector 462 determines one or more interferent type. An interferent level detector 464 may be used, in 512, to determine an interferent level of each interferent type.

The determination that the one or more liquid regions 356 is, as a whole, normal (N), or if not normal (N), the interferent type, may be accomplished by adding a number of pixels in the liquid regions 356 that have been previously classified by pixel classifier 458 as being N, H, I, or L. The classification as normal (N) or as containing an interferent may be based upon a largest number in each class, or a weighting scheme in some embodiments. Thus, in one embodiment, if a majority of pixels are classified as N, then the liquid regions 356 and the specimen 212 may be categorized as normal (N). If a majority of pixels are classified as H, then the liquid region 356 and the specimen 212 may be categorized as hemolysis (H). Likewise, if a majority of pixels are classified as I or L, then the liquid regions 356 and the specimen 212 may be categorized as Icterus (I), or lipemia (L), respectively. In other embodiments, a weighted majority voting scheme may be also used to classify the specimen 212 using the probabilities from the pixel classifier 458 as a weight. Other means for characterizing the specimen 212, as a whole, may be used.

Alternatively, if the specimen 212 has a relatively large amount of pixels that are classified in two or more interferent classes (e.g., H and I, H and L, I and L, or even HIL), then the method may report that multiple interferent types are present in the specimen 212.

Once the specimen 212 has been given a characterization by interferent type detector 462 as containing an interferent (e.g., H, I, and/or L), the interferent level detector 464 may be used to provide an interferent level for one or more interferent types in the specimen 212. Interferent level detector 464 may obtain an interferent level for the particular interferent by passing the pixels determined to be liquid by the liquid/non-liquid detector 454 through a level characterizing model, such as a supervised regression model. Any suitable regression model may be used, such as support vector regression (SVR), neural network regression, tree-based regression, or the like.

A different regression model, such as hemolysis regression model 465, icterus regression model 467, and lipemia regression model 469 may be used for each pixel of each interferent type. In one or more embodiments, each of the regression models 465, 467, 469 may be SVR machines and may be trained using only liquid regions that exhibit that particular type of interferent (e.g., H, I, or L). For example, the hemolysis regression model 465 may be trained with a broad range of hemolyzed specimens 212 having hemolysis levels across a diverse range of expected hemolysis levels. For example, hemolysis ranges may include hemolysis levels from about 50-525. Likewise, the icterus regression model 467 may be trained with a broad range of icteric specimens 212 having icterus levels across a diverse range of expected levels, including icterus levels from about 1.7 to 30. Similarly, lipemia regression model 469 may be trained with a broad range of lipemic specimens 212 having lipemia levels across a diverse range of expected levels, including lipemia levels from about 125-1000.

In some embodiments, the interferent levels may be discretized. For example, for the hemolysis regression model 465, discreet hemolysis levels of 50, 150, 250, and 525 may be used. For the icterus regression model 467, discreet icterus levels of 1.7, 6.6, 16, and 30 may be used, and for the lipemia regression model 469, discreet lipemia levels of 125, 250, 500, and 1000 may be used.

The final interferent level is determined by fusing the regression results of the liquid pixels of that particular interference type as passed through the desired regression model 465, 467, 469. If the interference levels of the model have been discretized, then the output from the regression models 465, 467, 469 will also be discretized by mapping to the closest target level. In any event, an interferent level may be provided for each detected interferent type in the specimen 212.

Accordingly, it should be apparent that the model-based interferent detection and classification method 500 carried out by the testing apparatus 140 may result in a rapid characterization of the specimen 212 as being either normal or containing one or more interferent therein. If the specimen 212 contains one or more interferent, then the method 500 may determine the interferent type or types present, and may also determine an interferent level for each interferent type present.

According to one or more additional embodiments, the pixelated image 350 may utilized to obtain additional information concerning the physical dimensional characteristics of the specimen 212 as will be described more fully below.

Moreover, certain physical dimensional and other parameters of the sample container 102 may be determined such as height of the sample container 102 (e.g., to an interface of the cap 214 and the sample container tube), overall fill height of the specimen 212 to the top of the serum portion 212S from a datum (e.g., a top surface), vertical height of the serum portion 212S only, and/or vertical height of the red blood cell portion 212RBC from a datum (e.g., a top surface) of the sample container carrier 122), which may be used to define a hematocrit level.

Additionally, an overall width of the sample container 102 may also be obtained from the pixelated image 350. Accordingly, a size of the sample container 102 may be classified. In other embodiments, the pixelated image 350 may be used to determine a color of the cap 214. Each of the physical characteristics of the sample container 102 may be obtained by well know methods, such as blob analysis or the like.

While the specimen quality station 130 has been shown ideally located such that the pre-screening is performed immediately after centrifugation on the centrifuge 124, it may be advantageous to include this feature directly on an analyzer (e.g., analyzer 106, 108, and/or 110) in some embodiments, or elsewhere. For example, stand-alone analyzers that are not connected to an automated sample container handling system could use this technique to validate specimens 212 prior to analysis.

Furthermore, the above indicates that pixels are passed through the various models. Pixels as used herein means individual pixels or a set of pixels (known as a superpixels) described in the paper entitled "SLIC Superpixels Compared to State-of-the-Art Superpixel methods" by Radhakrishna Achanta, et al. in IEEE Transactions on Pattern Analysis and Machine Intelligence, Vol. 34, No. 11, 2012. Superpixels may be formed by combining groups of pixels.

In another aspect, if a specimen 212 falls outside a predefined level of lipemia, hemolysis, or icterus, or contains a physical level, fill volume, or the like that will be incompatible to the analyzer (e.g., analyzer 106, 108, and/or 110), the lab personnel may be notified to take corrective action. In some cases, the corrective action may be an automated remedial action at the remediation station 131. Optionally, in some embodiments the analyzer (e.g., analyzer 106, 108, and/or 110) may also simply use the measurement of the interferent (e.g., lipemia) in the specimen 212 to correct the spectrophotometer readings to account for the scattered light not reaching its detector of the analyzer (e.g., analyzer 106, 108, and/or 110).

While the invention is susceptible to various modifications and alternative forms, specific system and apparatus embodiments and methods thereof have been shown by way of example in the drawings and are described in detail herein. It should be understood, however, that it is not intended to limit the invention to the particular systems, apparatus, or methods disclosed but, to the contrary, the intention is to cover all modifications, equivalents, and alternatives falling within the scope of the invention.

What is claimed is:

1. A method of determining a characteristic of a specimen contained within a sample container, comprising:
    generating a pixelated image of the specimen, the pixelated image comprising pixels;
    passing a plurality of the pixels through a liquid classification model, wherein each pixel passed through the liquid classification model is classified as liquid or non-liquid, wherein the liquid classification model is trained by graphically outlining liquid regions in multitude of examples of sample containers having different specimen conditions, occlusion by a label, and levels of serum and red blood cell portions;
    defining one or more liquid regions by pixels classified as liquid; and
    determining a presence of one or more interferent within the one or more liquid regions.

2. The method of claim 1, comprising: determining an a-value and a b-value for the pixels in the pixelated image in L*a*b color space.

3. The method of claim 1, wherein the pixelated image is subjected to gamma correction prior to the classifying.

4. The method of claim 1, wherein the pixelated image is compiled from multiple images.

5. The method of claim 1, wherein the liquid classification model is based upon a liquid/non-liquid detector.

6. The method of claim 1, wherein the liquid classification model further comprises a support vector machine.

7. The method of claim 1, wherein the determining a presence of an interferent within the one or more liquid regions is based upon a multi-class classification model generated from multiple interferent training sets.

8. The method of claim 1, wherein the pixels in the pixelated image that have been classified as liquid are further classified by a pixel classifier as being either:
    normal, or
    by interferent type as being one of lipemia, hemolysis, or icterus, wherein the pixel classifier is a supervised classification model.

9. The method of claim 8, wherein a classification as normal or by the interferent type is based upon a summation or weighting for each of the pixels classified in each class of normal, lipemia, hemolysis, or icterus.

10. The method of claim 1, wherein the determining a presence of an interferent within the one or more liquid regions comprises:
    determining an interferent type within the one or more liquid regions based upon a multi-class classification model; and
    determining an interferent level of the interferent type based upon a regression model.

11. The method of claim 10, wherein the regression model is trained for each interferent type based upon multiple training specimens exhibiting diverse interference levels.

12. The method of claim 1, comprising analyzing the pixelated image to determine a physical dimensional characteristic of the sample container.

13. The method of claim 1, comprising analyzing the pixelated image to determine a color of a cap on the sample container.

14. A testing apparatus adapted to determine a characteristic of a specimen in a sample container, comprising:
    one or more image capture devices configured to capture one or more images of the specimen and at least a portion of the sample container from which a pixelated image is generated;
    a liquid classification model operable to classify all pixels of the pixelated image passed through the liquid classification model as being either liquid or non-liquid and define one or more liquid regions by pixels classified as liquid, wherein the liquid classification model is trained by graphically outlining liquid regions in multitude of examples of sample containers having different specimen conditions, occlusion by a label, and levels of serum and red blood cell portions;
    a pixel classifier, based on a multi-class classification model, operable to determine for the pixels in the one or more liquid regions a classification as normal, hemolysis, icterus, or lipemia; and an interferent type detector operable to detect, based on a result of the pixel classifier, one or more interferent type within the one or more liquid regions.

15. The apparatus of claim 14, wherein the liquid classification model further comprises a support vector machine.

16. The apparatus of claim 14, wherein the liquid classification model is generated from multiple training sets.

17. The apparatus of claim 14, comprising an interferent level detector operable to determine an interferent level for the one or more interferent type detected.

18. The apparatus of claim 17, wherein the one or more interferent type is at least one selected from a group consisting of:

lipemia;
hemolysis; and
icterus.

19. The apparatus of claim 17, wherein the interferent level detector comprises a regression model that is trained for each interferent type based upon multiple training specimens exhibiting diverse interference levels.

20. A method of determining a characteristic of a specimen contained within a sample container, comprising:

generating a pixelated image of the specimen in the sample container at a quality control station in a first color space;

converting the pixelated image from the first color space to a second color space;

determining color components for pixels in the pixelated image in the second color space;

passing a plurality of the pixels through a liquid classification model, wherein each pixel passed through the liquid classification model is classified as liquid or non-liquid, and wherein the liquid classification model is trained by graphically outlining liquid regions in multitude of examples of sample containers having different specimen conditions, occlusion by a label, and levels of serum and red blood cell portions;

defining one or more liquid regions by the pixels that are classified as liquid pixels;

classifying the liquid pixels as being one of normal, hemolysis, icterus or lipemia based upon a multi-class classification model;

determining that the one or more liquid regions is either normal or includes one or more types of interferent based upon a number of the liquid pixels in each of normal, hemolysis, icterus or lipemia; and determining an interferent level for at least some of the one or more types of interferent based upon a regression model.

21. The method of claim 1, wherein the liquid classification model comprises a boosting classifier.

22. The method of claim 1, wherein the liquid classification model comprises an artificial neural network.

23. The method of claim 1, wherein the liquid classification model comprises a tree-based classifier.

24. The method of claim 1, wherein the liquid classification model comprises a logistic regression as a classifier.

25. The method of claim 1, wherein the liquid is serum or plasma.

26. The apparatus of claim 14, wherein the liquid is serum or plasma.

27. The method of claim 1, wherein generating the pixelated image comprises:

capturing multiple images of a sample container containing a specimen, each of the multiple images captured from a different viewpoint; and consolidating the multiple images into a pixilated image containing pixels.

* * * * *